United States Patent

[11] 3,603,334

[72] Inventors Guy E. Davies
Fareham;
Christopher G. S. Wilson, Cowplain, both of, England

[21] Appl. No. 22,454
[22] Filed Mar. 25, 1970
[45] Patented Sept. 7, 1971
[73] Assignee The Plessey Company, Limited
Ilford, Essex, England
[32] Priority Mar. 25, 1969
[33] Great Britain
[31] 15476/69

[54] FLUIDIC SYSTEMS
7 Claims, 4 Drawing Figs.

[52] U.S. Cl. .......... 137/81.5
[51] Int. Cl. .......... F15c 1/12, F15c 1/16
[50] Field of Search .......... 137/81.5; 235/201 PF

[56] References Cited

UNITED STATES PATENTS

| | | | |
|---|---|---|---|
| 3,410,291 | 11/1968 | Boothe et al. | 137/81.5 |
| 3,417,772 | 12/1968 | Schaeffer | 137/81.5 |
| 3,468,326 | 9/1969 | Cohen | 137/81.5 |
| 3,468,340 | 9/1969 | Di Camillo | 137/81.5 X |
| 3,473,545 | 10/1969 | Boyadjieff | 137/81.5 |
| 3,515,158 | 6/1970 | Utz | 137/81.5 |
| 3,537,466 | 11/1970 | Chapin | 137/81.5 |

*Primary Examiner*—Samuel Scott
*Attorney*—Mason, Mason & Albright

ABSTRACT: The invention relates to fluidic amplifiers and in particular to a system which improves the efficiency of the amplifier when operating at high pressures. The system includes a proportional amplifier which provides from one of its output legs, fluid to the supply control jet of a planar jet amplifier. The other output leg of the proportional amplifier feeds a vortex amplifier which in turn can vary the vent pressure of the planar jet amplifier. Therefore the pressure at the vent output is varied automatically as a function of the pressure at the control jet input and the supply jet input of the jet collector amplifier in a sense such as to extend the effective range of operation of the amplifier.

BEST AVAILABLE COPY

PATENTED SEP 7 1971 3,603,334

INVENTORS
GUY E. DAVIES
CHRISTOPHER G.S. WILSON
BY Mason, Mason & Albright
ATTORNEYS

BEST AVAILABLE COPY

INVENTORS
GUY E. DAVIES
CHRISTOPHER G. S. WILSON
BY Mason, Mason & Albright
ATTORNEYS

FLUIDIC SYSTEMS

The present invention relates to fluidic systems and in particular to a high-pressure fluidic amplifier.

The present invention provides a fluidic system, comprising a vented amplifier having a control jet input, a supply jet input, a collector output and a vent output, a proportional amplifier having a control jet input, a supply jet, two output legs and a vent output, and a vortex amplifier having a supply jet input and a control jet input, the two output legs of the proportional amplifier being respectively connected to the control jet inputs of the vortex and vented amplifiers and the two vent outputs being connected to the supply jet input of the vortex amplifier whereby when fluid is supplied under pressure to the supply jet inputs of the vented and proportional amplifiers the fluid pressure at the two vent outputs is varied so as to augment any increase in pressure from the output of the vented amplifier.

The present invention further provides a fluidic system, comprising a vented amplifier having a control jet input, a supply jet input, a collector output and a vent output, variable resistance means for varying the resistance to fluid flow from the output vent, and control means operable as a function of the pressure difference between the supply jet input and the collector output to vary said resistance means in such a way as to augment any increase in pressure at the collector output.

The present invention still further provides a fluidic system, comprising a vented amplifier having a supply jet input, a collector output and an output vent, variable resistance means for varying the flow resistance of the output vent, control means for varying the ratio of the pressure at the collector output to the pressure at the supply jet input, and feedback means operative to increase the resistance means when the control means acts to increase the said ratio.

A high-pressure fluidic amplifier embodying the invention will now be described, by way of example, with reference to the accompanying diagrammatic drawings in which.

Figures 1, 2:
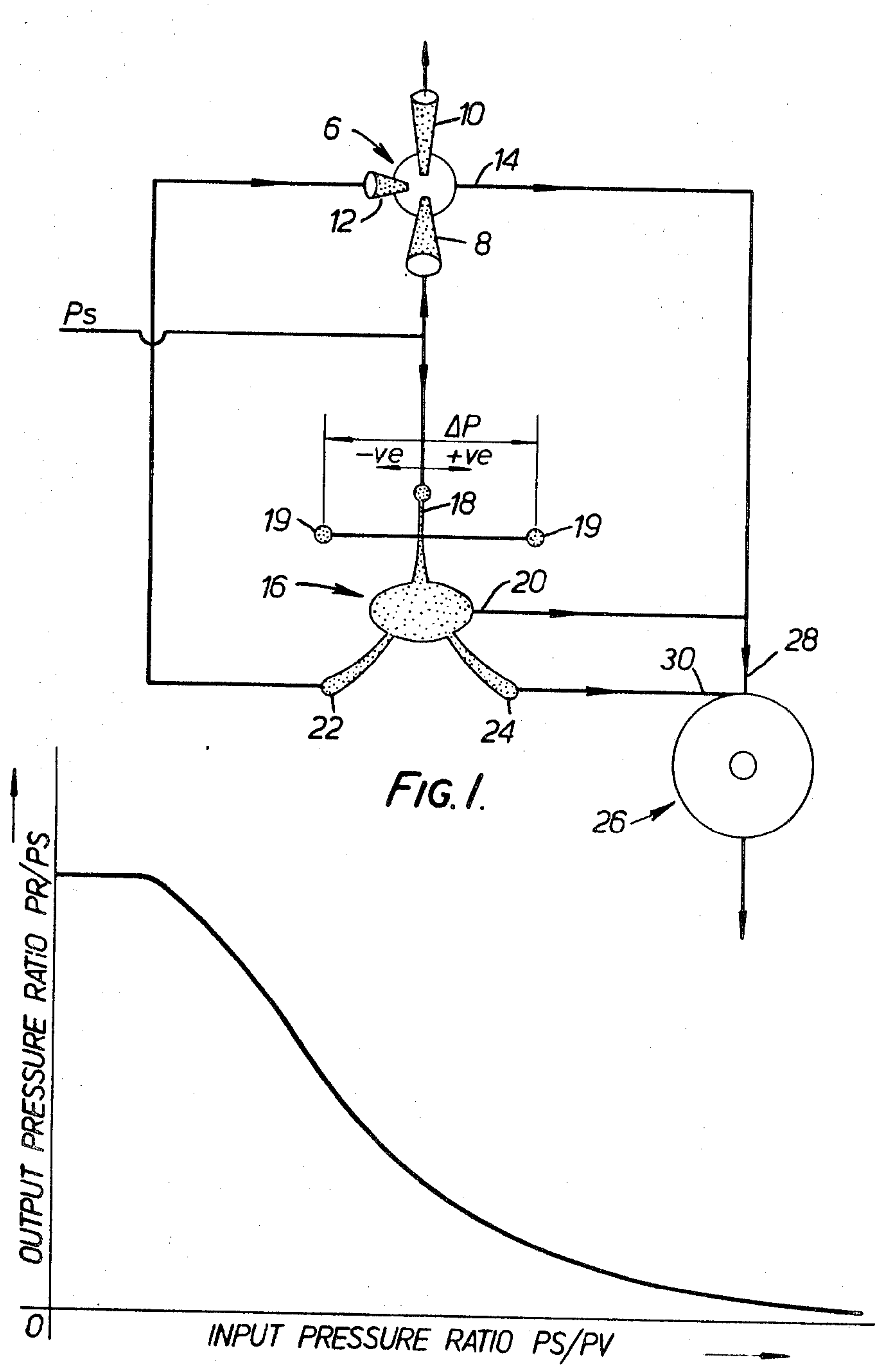
FIG. 1 is a schematic view of one of the high-pressure amplifier arrangements.
FIG. 2 is a graph showing the input pressure ratio to output pressure ratio characteristic of the amplifier of FIG. 1.

FIG. 1 shows a vented amplifier 6 in the form of a planar jet collector amplifier which has a supply jet input 8, a collector output 10, a control jet input 12 and a vent output 14.

The vented amplifier is controlled by a proportional amplifier 16 which has a supply jet input 18, which is connected in parallel with the supply jet input 8 to a fluid source (not shown) having a pressure $P_s$, a vent output 20, and two output legs 22 and 24 one of which is connected to the control jet input 12 of the vented amplifier.

The proportional amplifier 16 also has two control jet inputs 19 for controlling the ratio of the fluid pressures in each output leg.

Fluid flow from the vent outputs 14 and 20 is varied by a vortex amplifier 26. The vortex amplifier 26 has a supply jet input 28 to which both vent outputs 14 and 20 are connected and a control jet input 30 which is supplied by the second output leg 24 of the proportional amplifier.

At relatively low operating pressures, the vented amplifier has a fairly linear input/output pressure ratio characteristic. However, when operated with relatively high pressures the pressures at the vent output have a significant effect on the amplifier stability and the pressure recovery (i.e. the ratio of the pressure at the supply jet input to the collector output). This effect is more clearly shown in FIG. 2 in the input/output pressure ratio characteristic in which the input ratio PS/PV is ratio of the pressure PS at the supply jet input 8 and the pressure PV at the vent output 14 and in which the output ratio PR/PS (the pressure recovery) is the ratio of the pressure PR at the collector output 10 and the pressure PS at the supply jet input 8.

Thus, as can be seen from the characteristic, an increase in pressure supply $P_s$, while $P_v$ is maintained constant, will cause a reduction in pressure recovery i.e. in PR/PS. However this reduction can be countered by increasing the vent pressure, and the high-pressure amplifier arrangement of FIG. 1 enables this to be done in a manner which will now be described.

Fluid under pressure PS is supplied from a source to the supply jet inputs 8 and 18 of the vented and proportional amplifiers. Fluid from the proportional amplifier 16 will emerge with equal pressures from the two output legs 22 and 24. Thus fluid from the leg 24 will be supplied to the control jet input 12 of the vented amplifier 6 to provide a predetermined deflection of the fluid jet emerging from the supply jet input 8. Fluid from the output leg 29 and supplied to the control jet input 30 of the vortex amplifier 26 will interact with fluid entering the vortex amplifier 26 from the vent outputs 14 and 20 to set up a pressure difference in the vortex amplifier 26 which will be reflected as an increase in pressure at the vent outputs 14 and 20. Now, by applying a pressure differential across the proportional amplifier 16, by means of control jet inputs 19, to decrease the pressure in the output leg 22, the effect of the control jet 12 is decreased and consequently the output pressure from the vented amplifier is increased. With the decrease in pressure of the output leg 22 of the proportional amplifier, the pressure at the output leg 24 increases and produces a greater interaction between the control jet input 30 and supply jet input of 28 of the vortex amplifier 26. This in turn increases the pressure at the vent output 19 of the vented amplifier 6 to improve the pressure recovery of the vented amplifier.

The pressure at the vent output 20 of the proportional amplifier 16 is also increased which improves its pressure recovery (i.e. increases the pressure of both legs); here, however, the effect is regenerative as the increase in pressure in leg 24 causes a further increase in the pressure at the vent output 14 of the vented amplifier through the vortex amplifier 26, thus improving the pressure recovery of the vented amplifier 6 still further.

Figure 4:
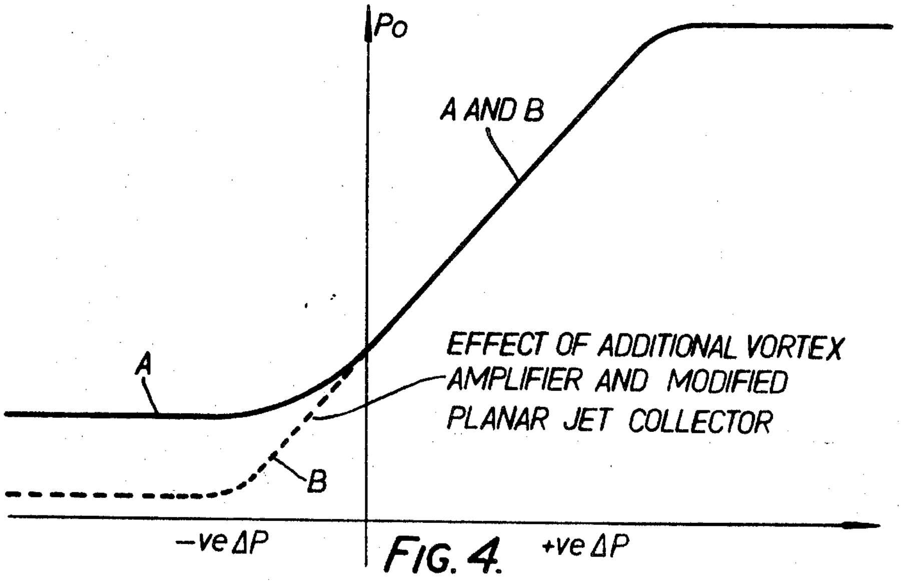
FIG. 4 shows a comparison of the characteristics of the arrangements of FIGS. 1 and 3.

FIG. 4 shows at A the input/output pressure characteristic of the complete high-pressure amplifier arrangement in which the output pressure from the vented amplifier 6 is indicated on the abscissa axis and in which positive and negative pressure differential $\Delta P$ applied to the proportional amplifier 16 is indicated on the ordinate axis.

The modified high-pressure amplifier arrangement of FIG. 3 will now be described in which items similar to those in FIG. 1 are similarly referenced.

Figure 3:
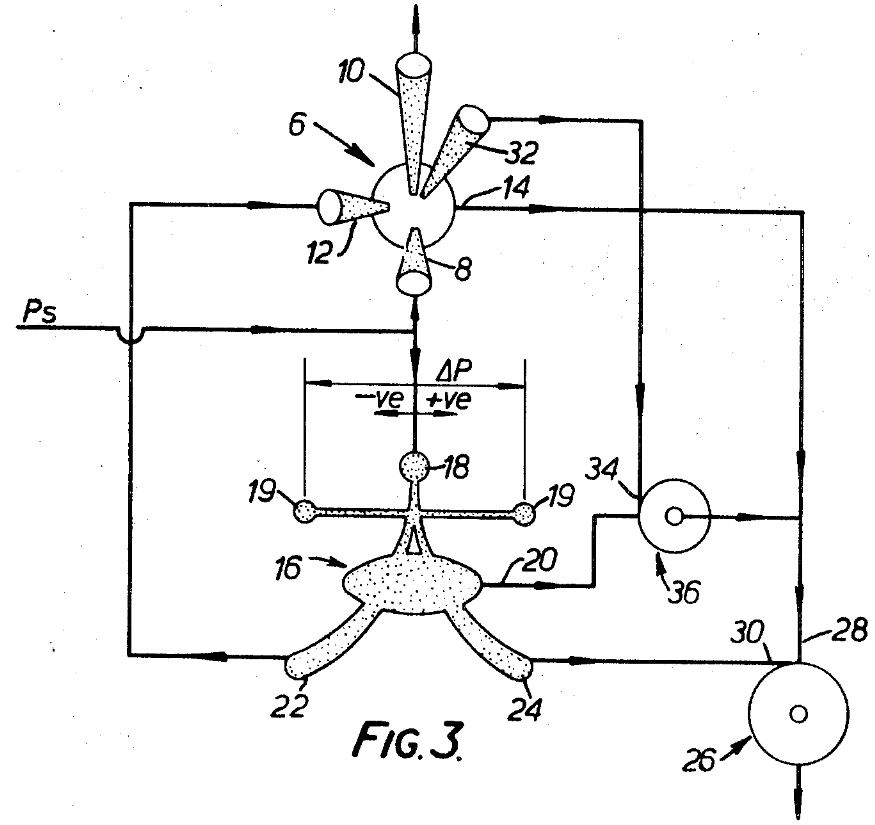
FIG. 3 is a schematic view of a modified form of the high-pressure amplifier arrangement.

In the modification shown in FIG. 3 the vented amplifier is provided with a further output 32 at which a fluid pressure is developed in dependence upon the extent of interaction between the control jet and supply jet inputs 12 and 8. The further output 32 is connected to the control jet input 34 of an additional vortex amplifier 36 which is interposed between the output vent 20 of the proportional amplifier 16 and the supply jet input 28 of the main vortex amplifier 26.

The additional vortex amplifier 36 is such that, at high output pressures from output 10 when the pressure at the output 32 of the vented amplifier 6 is very low, the additional vortex amplifier 36 has little or no effect on the pressure at the vent output 20 of the proportional amplifier 16; this is controlled by the main vortex amplifier 26 as described in conjunction with FIG. 1. When however the pressure of the output 32 of the vented amplifier 16 is increased by the action of the vortex amplifier 36 and has a regenerative effect resulting in a slightly lower recovery in the main output 10 of the vented amplifier 6. The effect of this is to increase the lower limit of the input/output characteristic of the high-pressure amplifier arrangement as indicated by curve B in FIG. 3, without affecting the upper end of the characteristic.

It will of course be appreciated that the circuit is composed of standard fluid components which can be replaced by other components performing a similar function, for example the vortex amplifiers can be replaced by any component (for example a variable throttle) which will provide a variable resistance to fluid flow from the vent outputs, and the proportional amplifier can be replaced by an arrangement which provides a variable fluid supply for the control jet of the vented amplifier and controls the variable resistance in dependence upon the fluid supply rate.

We claim:

1. In a fluidic system, a vented amplifier having a control jet input, a supply jet input, a collector output and a vent output, a proportional amplifier having control jet input means, a supply jet, two output legs and a vent output, a vortex amplifier having a supply jet input and a control jet input, means connecting the two output legs of the proportional amplifier respectively to the control jet inputs of the vortex and vented amplifiers, and means connecting the two vent outputs to the supply jet input of the vortex amplifier whereby when fluid is supplied under pressure to the supply jet inputs of the vented and proportional amplifiers the fluid pressure at the two vent outputs is varied so as to augment any increase in pressure from the collector output of the vented amplifier.

2. In a fluidic system, a vented amplifier having a control jet input, a supply jet input, a collector output and a vent output, variable resistance means connected to the vent output of the vented amplifier for varying the resistance to fluid flow from the output vent, control means connected to said control jet input to vary the pressure difference between the supply jet input and the collector output, and means connecting the control means to said resistance means to vary said resistance means in such a way as to augment any increase in pressure at the collector output resulting from a change in fluid pressure at the control jet input.

3. A system according to claim 2, wherein the control means comprises a proportional amplifier having two output legs and a supply jet input, and means connecting one output leg to control the variable resistance means and the other output leg to the control jet input of the vented amplifier.

4. A system according to claim 3, wherein the proportional amplifier includes a vent output and means connecting the vent output to said resistance means so that fluid flow from the vent output is also controlled by said resistance means.

5. A system according to claim 3, wherein the variable resistance means comprises a vortex amplifier having a supply jet input, a control jet input, means connecting the vent outputs of the proportional and vented amplifiers to the supply jet input of the vortex amplifier and means connecting the said other output leg of the proportional amplifier to the control jet input of the vortex amplifier.

6. A system according to claim 2, wherein the vented amplifier includes a further output arranged to receive a proportion of the fluid flow through the vented amplifier when fluid is supplied to the control jet input.

7. A system according to claim 6, wherein the variable resistance means includes a first vortex amplifier having a supply jet input and a control jet input, means connecting the control jet input to said other output leg of the proportional amplifier and the supply jet input to the output vent of the vented amplifier, a second vortex amplifier having a supply jet input, a control jet input and in output, means connecting the supply jet input to the vent output of the proportional amplifier, the control jet input to the further output of the vented amplifier, and the output to the supply jet input of the first vortex amplifier.